United States Patent
Funada

(10) Patent No.: US 8,615,037 B2
(45) Date of Patent: Dec. 24, 2013

(54) DISPLAY APPARATUS

(75) Inventor: Masahiro Funada, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 279 days.

(21) Appl. No.: 13/162,181

(22) Filed: Jun. 16, 2011

(65) Prior Publication Data

US 2011/0310983 A1    Dec. 22, 2011

(30) Foreign Application Priority Data

Jun. 17, 2010   (JP) ................. 2010-138537

(51) Int. Cl.
*H04B 1/66* (2006.01)

(52) U.S. Cl.
USPC ............... 375/240; 348/537; 348/536

(58) Field of Classification Search
USPC ................. 375/240; 348/536–537
See application file for complete search history.

(56) References Cited

U.S. PATENT DOCUMENTS

| | | | | |
|---|---|---|---|---|
| 6,340,993 | B1 * | 1/2002 | Hasegawa et al. | 348/572 |
| 7,019,764 | B2 * | 3/2006 | Neal | 345/698 |

FOREIGN PATENT DOCUMENTS

| | | | |
|---|---|---|---|
| JP | 11-177847 A | | 7/1999 |
| JP | 11177847 A | * | 7/1999 |
| JP | 2000-020008 A | | 1/2000 |
| JP | 2000020008 A | * | 1/2000 |

* cited by examiner

*Primary Examiner* — William C Vaughn, Jr.
*Assistant Examiner* — Naod Belai
(74) *Attorney, Agent, or Firm* — Rossi, Kimms & McDowell LLP

(57) ABSTRACT

The display apparatus includes an image display element being driven based on a digital video signal, a quantizing part converting an input analog image signal into the digital video signal based on a quantization phase and a quantization frequency, and a converting part converting an input value into an output value, the input value being a difference value of signal values of pixels adjacent to each other in the digital video signal. The apparatus includes an accumulating part accumulating the output values from the converting part that converts the difference values obtained over entire pixels in one frame of the digital video signal to produce an accumulation evaluation value, and a controller adjusting the quantization phase in the quantizing part such that the accumulation evaluation value becomes maximum. The output values $a(m)$ for the input values $k1$, $k2$ and $k3$ satisfy conditions of $a(k1+1)-a(k1)<a(k2+1)-a(k2)$, $a(k2+1)-a(k2)=a(k3+1)-a(k3)$ and $k1<m_{i-1} \leq k2<k3<m_i$.

4 Claims, 6 Drawing Sheets

| SECTION | DIFFERENCE | INCLINATION | OFFSET |
|---|---|---|---|
| 1 | 0~31 | $2^0$ | $(2^0-1) \times 2^5$ |
| 2 | 32~63 | $2^1$ | $(2^1-1) \times 2^5$ |
| 3 | 64~95 | $2^2$ | $(2^2-1) \times 2^5$ |
| 4 | 96~127 | $2^3$ | $(2^3-1) \times 2^5$ |
| 5 | 128~159 | $2^4$ | $(2^4-1) \times 2^5$ |
| 6 | 160~191 | $2^5$ | $(2^5-1) \times 2^5$ |
| 7 | 192~223 | $2^6$ | $(2^6-1) \times 2^5$ |
| 8 | 224~255 | $2^7$ | $(2^7-1) \times 2^5$ |

| SECTION | DIFFERENCE | INCLINATION | OFFSET |
|---|---|---|---|
| 1 | 0~31 | $2^0$ | $(2^0-1) \times 2^5$ |
| 2 | 32~63 | $2^1$ | $(2^1-1) \times 2^5$ |
| 3 | 64~95 | $2^2$ | $(2^2-1) \times 2^5$ |
| 4 | 96~127 | $2^3$ | $(2^3-1) \times 2^5$ |
| 5 | 128~159 | $2^4$ | $(2^4-1) \times 2^5$ |
| 6 | 160~191 | $2^3$ | $(2^5-1) \times 2^5$ |
| 7 | 192~223 | $2^2$ | $(2^5+2^3-1) \times 2^5$ |
| 8 | 224~255 | $2^1$ | $(2^5+2^3+2^2-1) \times 2^5$ |

DISPLAY APPARATUS

BACKGROUND OF THE INVENTION

1. Field of the Invention

The present invention relates to a display apparatus such as a projector and a television monitor.

2. Description of the Related Art

When displaying analog video signals for documents and graphics produced by a computer on a display apparatus, it is important to match a quantization clock and an effective image area, which are needed to quantize the analog video signal in the computer, with those in the display apparatus. In order to perform proper quantization, it is necessary to optimize a frequency of the quantization clock (hereinafter referred to as a "quantization frequency") and a phase of the quantization clock (hereinafter referred to as a "quantization phase"), and thus a function of automatically performing such optimization, which is a so-called automatic quantization clock adjustment function, has been proposed.

Japanese Patent Laid-Open No. 11-177847 discloses an apparatus having such an automatic quantization clock adjustment function. This apparatus performs for each phase a process to acquire an accumulated value of differences between video signal values of one or more pairs of pixels adjacent to each other in one frame of an input video signal. As shown in FIG. 6, since proper quantization increases the accumulated value of the video signal value differences and improper quantization decreases the accumulated value, the apparatus adjusts the quantization frequency and quantization phase such that the acquired accumulated value of the video signal value differences becomes maximum.

Moreover, Japanese Patent Laid-Open No. 2000-020008 discloses an apparatus having an automatic quantization clock adjustment function that accumulates, in order to acquire the accumulated value described in Japanese Patent Laid-Open No. 11-177847, square values of the video signal value differences.

The apparatus disclosed in Japanese Patent Laid-Open No. 11-177847 is based on a premise that, as shown in FIG. 6, the input video signal includes some parts where an inclination of video signal level change reverses at each pixel, and improves adjustment accuracy of the automatic quantization clock adjustment function as such parts increases. However, for an input video signal including no or few parts where the inclination of the video signal level change reverses at each pixel, the accumulated value of the video signal value differences in the proper quantization and that in the improper quantization have no difference, as shown in FIG. 7, which makes it impossible to perform sufficient adjustment.

Moreover, the apparatus disclosed in Japanese Patent Laid-Open No. 2000-020008 includes a large scale circuit for calculation of the square value, which increases cost.

SUMMARY OF THE INVENTION

The present invention provides a display apparatus capable of obtaining a proper quantization clock for a video signal including few parts where an inclination of video signal level change reverses at each pixel, without calculating square values.

The present invention provides as one aspect thereof a display apparatus including an image display element configured to be driven based on a digital video signal to display a video, a quantizing part configured to convert an input analog image signal into the digital video signal based on a quantization phase and a quantization frequency, a converting part configured to convert an input value into an output value, the input value being a difference value of signal values of pixels adjacent to each other in the digital video signal, an accumulating part configured to accumulate the output values from the converting part that converts the difference values obtained over entire pixels in one frame of the digital video signal to produce an accumulation evaluation value, and a controller configured to adjust the quantization phase in the quantizing part such that the accumulation evaluation value becomes maximum. When n represents a number of bits of the digital video signal, $a(m)$ represents the output value from the converting part for the input value m thereto, and $m_i$ ($i=1, 2, \ldots, I-1$) represents a boundary value between two sections adjacent to each other among I sections obtained by dividing an entire range $0$-$2^n-1$ of the input value in the converting part, the output values from the converting part for arbitrary ones k1, k2 and k3 of the input values satisfy the following conditions where k1, k2 and k3 have a relationship of $k1 < m_{i-1} \leq k2 < k3 < m_i$:

$$a(k1+1)-a(k1) < a(k2+1)-a(k2)$$

$$a(k2+1)-a(k2) = a(k3+1)-a(k3).$$

The present invention provides as another aspect thereof a display apparatus including an image display element configured to be driven based on a digital video signal to display a video, a quantizing part configured to convert an input analog image signal into the digital video signal based on a quantization phase and a quantization frequency, a converting part configured to convert an input value into an output value, the input value being a difference value of signal values of pixels adjacent to each other in the digital video signal, an accumulating part configured to accumulate the output values from the converting part that converts the difference values obtained over entire pixels in one frame of the digital video signal to produce an accumulation evaluation value, and a controller configured to adjust the quantization frequency in the quantizing part to a frequency at which a ratio of a maximum value of the accumulation evaluation value produced for each quantization phase to a minimum value thereof becomes maximum. When n represents a number of bits of the digital video signal, $a(m)$ represents the output value from the converting part for the input value m thereto, and $m_i$ ($i=1, 2, \ldots, I-1$) represents a boundary value between two sections adjacent to each other among I sections obtained by dividing an entire range $0$-$2^n-1$ of the input value in the converting part, the output values from the converting part for arbitrary ones k1, k2 and k3 of the input values satisfy the following conditions where k1, k2 and k3 have a relationship of $k1 < m_{i-1} \leq k2 < k3 < m_i$:

$$a(k1+1)-a(k1) < a(k2+1)-a(k2)$$

$$a(k2+1)-a(k2) = a(k3+1)-a(k3).$$

The present invention provides as still another aspect thereof a display apparatus including an image display element configured to be driven based on a digital video signal to display a video, a quantizing part configured to convert an input analog image signal into the digital video signal based on a quantization phase and a quantization frequency, a converting part configured to convert an input value into an output value, the input value being a difference value of signal values of pixels adjacent to each other in the digital video signal, an accumulating part configured to accumulate the output values from the converting part that converts the difference values obtained over entire pixels in one frame of the digital video signal to produce an accumulation evaluation value, and a controller configured to adjust the quantization phase in the quantizing part such that the accumulation evaluation value becomes maximum. When n represents a number of bits of the digital video signal, $a(m)$ represents the output value from the converting part for the input value m thereto, and $m_i$ (i=1, 2, ..., I–1) represents a boundary value between two sections adjacent to each other among I sections obtained by dividing an entire range $0$-$2^n$–1 of the input value in the converting part, from a first section including 0 to a second section including $2^{n-1}$ among the I sections, the output values from the converting part for arbitrary ones k1, k2 and k3 of the input values satisfy the following conditions where k1, k2 and k3 have a relationship of $k1<m_{i-1}\leq k2<k3<m_i$:

$$a(k1+1)-a(k1)<a(k2+1)-a(k2)$$

$$a(k2+1)-a(k2)=a(k3+1)-a(k3), \text{ and}$$

in a third section where the input value is greater than that of the second section among the I sections, the output values from the converting part for arbitrary ones k4 and k5 of the input values satisfy the following conditions where k4 and k5 have a relationship of $2^{n-1}\leq k4<m_i\leq k5$:

$$a(k5-k4)-a(k5-(k4+1))<a(k4+1)-a(k4).$$

The present invention provides as yet still another aspect thereof a display apparatus including an image display element configured to be driven based on a digital video signal to display a video, a quantizing part configured to convert an input analog image signal into the digital video signal based on a quantization phase and a quantization frequency, a converting part configured to convert an input value into an output value, the input value being a difference value of signal values of pixels adjacent to each other in the digital video signal, an accumulating part configured to accumulate the output values from the converting part that converts the difference values obtained over entire pixels in one frame of the digital video signal to produce an accumulation evaluation value, and a controller configured to adjust the quantization frequency in the quantizing part to a frequency at which a ratio of a maximum value of the accumulation evaluation value produced for each quantization phase to a minimum value thereof becomes maximum. When n represents a number of bits of the digital video signal, $a(m)$ represents the output value from the converting part for the input value m thereto, and $m_i$ (i=1, 2, ..., I–1) represents a boundary value between two sections adjacent to each other among I sections obtained by dividing an entire range $0$-$2^n$–1 of the input value in the converting part, from a first section including 0 to a second section including $2^{n-1}$ among the I sections, the output values from the converting part for arbitrary ones k1, k2 and k3 of the input values satisfy the following conditions where k1, k2 and k3 have a relationship of $k1<m_{i-1}\leq k2<k3<m_i\leq 2^{n-1}$:

$$a(k1+1)-a(k1)<a(k2+1)-a(k2)$$

$$a(k2+1)-a(k2)=a(k3+1)-a(k3), \text{ and}$$

in a third section where the input value is greater than that of the second section among the I sections, the output values from the converting part for arbitrary ones k4 and k5 of the input values satisfy the following conditions where k4 and k5 have a relationship of $2^{n-1}\leq k4<m_i\leq k5$:

$$a(k5-k4)-a(k5-(k4+1))<a(k4+1)-a(k4).$$

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Figure 1:
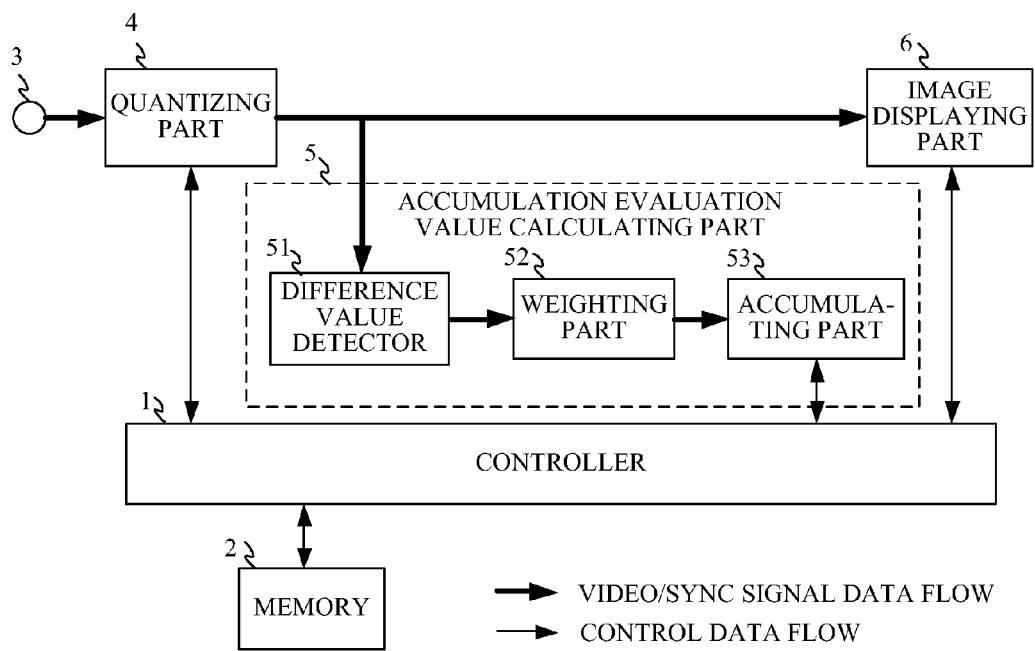
FIG. 1 is a block diagram showing the configuration of a display apparatus that is common to each of Embodiments 1 and 2 of the present invention.

First, prior to description of specific embodiments of the present invention, basic matters common to the embodiments will be described. FIG. 1 shows the configuration of a display apparatus common to the embodiments. A controller 1 controls operation of respective parts in the display apparatus according to various computer programs and data stored in a memory 2. To an analog image input terminal 3, an analog video signal supplied from an external apparatus such as a computer is input.

A quantizing part 4 quantizes the input analog video signal to a digital video signal with n bits, based on a phase of a quantization clock (hereinafter referred to as a "quantization phase") and a frequency thereof (hereinafter referred to as a "quantization frequency") which are set by the controller 1.

An image displaying part 6 is constituted by an image display element having plural pixels and its driving circuit, and drives the image display element based on the digital video signal input from the quantizing part 4 to display a video by the plural pixels of the image display element.

An accumulation evaluation value calculating part 5 includes a difference value detector 51, a weighting part 52 serving as a converting part and an accumulating part 53.

The difference value detector 51 detects an absolute value of a difference value between the digital video signal values of the pixels adjacent to each other on the image display element in the image displaying part 6. The absolute value of the difference value between the digital video signal values is hereinafter referred to as a "difference absolute value". The pixels adjacent to each other mean a pair of pixels including one pixel and the other pixel adjacent to the one pixel on, for example, its left side.

The weighting part 52 converts the difference absolute value detected by the difference value detector 51 as an input value into an output value by a weighting operation described later.

The accumulating part 53 accumulates the output values converted by the weighting part 52 from the difference absolute values obtained from the entire pixels in one frame of the digital video signal to produce an accumulation evaluation value. The accumulation evaluation value produced by the accumulating part 53 is sent to the controller 1.

A detailed description will hereinafter be made of the weighting operation in the weighting part 52. The weighting operation is an operation (calculation) depending on a size of the difference absolute value that is the input value, and has a characteristic satisfying the following two conditions where a(m) represents the input value and m represents the output value.

The first condition is to divide the input value into I (two or more) sections, and to equalize the inclination of the output value a(m) to the input value m in a same section. The second condition is to establish a relationship of $a(m)+a(k-m)<a(k)$ for an arbitrary input value k belonging to a maximum section I and each input value m satisfying a condition of $0<m<k$.

Figure 2:
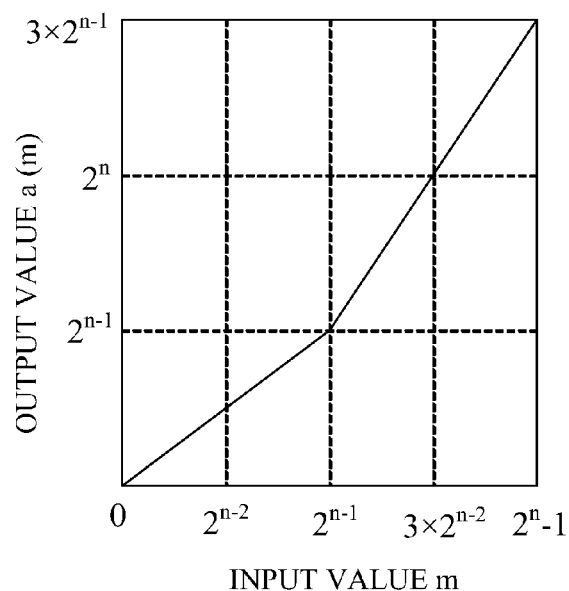
FIG. 2 shows an input-output relation of a weighting part in the display apparatus of FIG. 1.

FIG. 2 shows an example that satisfies the above two conditions. In the example of FIG. 2, the entire range $0$-$2^n-1$ of the input value m is divided into two sections at a boundary value of $2^{n-1}$. The inclination of the output value to the input value in a section $0$-$2^n-1$ is 1, and the inclination of the output value to the input value in a section $2^{n-1}$-$2^n-1$ is 2. As described above, n represents the number of bits of the analog video signal.

As mentioned above, the accumulating part 53 outputs the value obtained by accumulating the output values output from the weighting part 52 over the entire pixels in one frame as the accumulation evaluation value. Therefore, an input video signal in which white pixels and black pixels are horizontally consecutive provides a maximum accumulation evaluation value. It is desirable that the accumulating part 53 output a combined value of the accumulation evaluation values for R, G and G channels. However, the accumulating part 53 may output the accumulation evaluation value for any one of the R, G and G channels. The accumulation evaluation value as an accumulation result is reset by a vertical synchronization signal. The accumulation evaluation value calculating part 5 (accumulating part 53) outputs, in response to an acquisition request from the controller 1, the accumulation evaluation value for a previous frame to the controller 1.

Next, description will be made of operations of the controller 1. Description will be first made of an operation (control method) for automatically adjusting the quantization phase. The following description is based on a premise that the quantization frequency is set to a proper value. As long as the quantization frequency is set to the proper value, even though the input video signal includes few (or almost no) parts where an inclination of change of a video signal level (hereinafter referred to as "video signal level change") reverses at each pixel, a proper quantization phase makes the accumulation evaluation value provided by the accumulation evaluation value calculating part 5 greater (higher) than that for an improper quantization phase.

Figure 3:
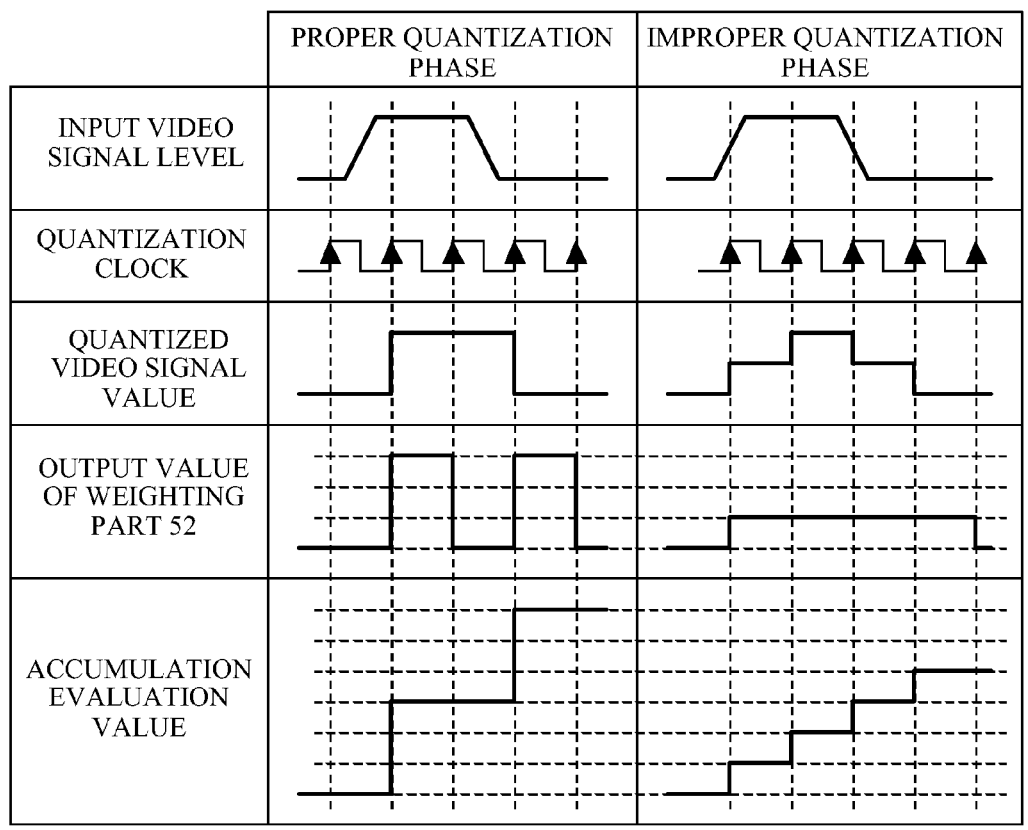
FIG. 3 shows a process for calculating an accumulated value in a case of inputting a video signal including few parts where an inclination of video signal level change reverses at each pixel, to the display apparatus of FIG. 1.

A principle thereof will be described with reference to FIG. 3. FIG. 3 shows processes from input of the video signal including few parts where the inclination of the video signal level change reverses at each pixel until calculation of the accumulation evaluation value. The weighting operation in the weighting part 52 is performed by using the weighting characteristic example shown in FIG. 2.

As shown in FIG. 3, the proper quantization phase enables the quantization in stable parts of the input video signal, so that the output value from the difference value detector 51 is increased, and therefore the weighting operation is performed by a weighting characteristic region where the inclination of the output value to the input value is large in the weighting part 52. Thus, the output from the weighting part 52 to the accumulating part 53 becomes large. On the other hand, the improper quantization phase causes the quantization in transition parts of the input video signal, so that the output value from the difference value detector 51 is kept low, and therefore the weighting operation is performed by a weighting characteristic region where the inclination of the output value to the input value is small in the weighting part 52. Thus, the output from the weighting part 52 to the accumulating part 53 becomes small. Accordingly, in order to optimally adjust the quantization phase, each embodiment acquires the accumulation evaluation value for each quantization phase, and controls (adjusts) the quantization phase such that that the accumulation evaluation value becomes maximum.

Next, description will be made of a process (control method) for automatically adjusting the quantization frequency. An improper quantization frequency alternately provides, regardless of setting of the quantization phase, a proper quantization phase state and an improper quantization phase state shown in FIG. 3. In this case, even though the quantization phase is changed, the accumulation evaluation value is little changed. Therefore, with decision of selectable quantization frequencies, performing the following process (control) enables adjustment of the quantization frequency to an optimum value.

First, the process acquires the accumulation evaluation value for each quantization phase at a first selectable quantization frequency, finds a maximum value and a minimum value thereamong, and calculates a value of "maximum value/minimum value" that is a ratio of the maximum value of the accumulation evaluation values to the minimum value thereof. Next, the process similarly calculates values of "maximum value/minimum value" at second and more selectable quantization frequencies. Finally, the process selects one selectable quantization frequency at which the value of "maximum value/minimum value" is maximum in the above selectable quantization frequencies, as the optimum quantization frequency.

The display apparatus thus configured enables automatic adjustment of the quantization clock to a proper clock even though the input video signal includes few or almost no parts where the inclination of the video signal level change reverses at each pixel. Moreover, the display apparatus can perform the adjustment of the quantization clock with simple linear calculation as shown in FIG. 2 without performing square calculation, which enables circuit simplification and circuit scale reduction.

Embodiment 1

Next, description will be made of a first embodiment (Embodiment 1) of the present invention. The configuration of the display apparatus of this embodiment is as described above with reference to FIG. 1.

In this embodiment, the weighting operation performed in the weighting part 52 satisfies the following third condition in addition to the above-described first and second conditions. The third condition is that, when $m_i$ (i=1, 2, ..., I-1) represents a boundary value between two sections adjacent to each other among I sections obtained by dividing the entire range $0$-$2^n-1$ of the input value to the weighting part 52, the output values from the weighting part 52 for arbitrary ones k1, k2 and k3 of the input values to the weighting part 52 satisfy the following relationships (conditions) where k1, k2 and k3 have a relationship of $k1<m_{i-1}\le k2<k3<m_i$:

$$a(k1+1)-a(k1)<a(k2+1)-a(k2)$$

$$a(k2+1)-a(k2)=a(k3+1)-a(k3).$$

That is, in the third condition, the inclination of the output value to the input value set in the weighting part 52 in a section where the input value is larger than those in other sections is steeper (larger) than the inclinations in the other sections.

Figures 4A, 4B:
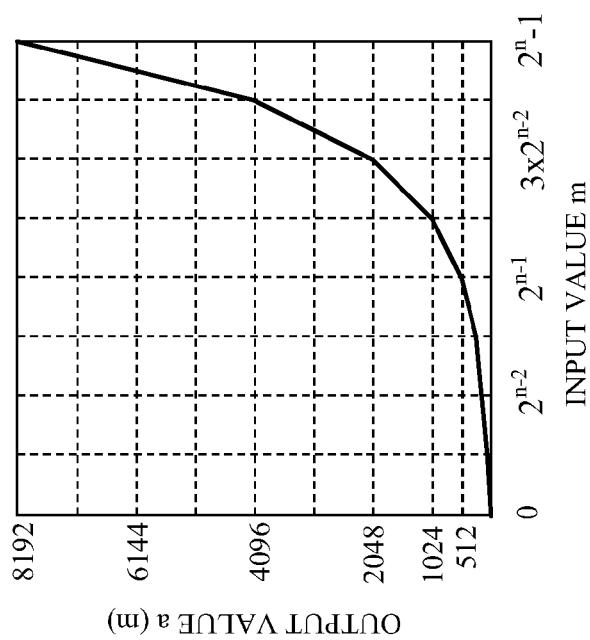
FIG. 4A and FIG. 4B shows an input-output relation of the weighting part in the display apparatus of Embodiment 1.

FIGS. 4A and 4B show an example of a weighting operation characteristic that satisfies the first to third conditions. In FIGS. 4A and 4B, the quantization part 4 performs 8-bit quantization, and the section division is performed by using multiples of as boundaries (boundary values). Moreover, the inclination of the output value to the input value set in the weighting part 52 increases with each change of the section over the boundary to twice the inclination in the previous section. FIG. 4A shows a graph indicating the relationship between the input value and the output value (input-output relation), and FIG. 4B shows the input value (difference), the inclination of the output value to the input value and an offset amount in each of the sections.

In order to realize the weighting operation characteristic shown in FIGS. 4A and 4B, this embodiment provides the following circuit configuration to the weighting part 52.

Specifying the section can be performed by using high three bits. Each inclination of the output value to the input value is defined as a value of power of two, so that the inclination can be obtained by bit-shifting low five bits by an amount depending on the section. Such a bit shift circuit (inclination processing circuit) can be easily configured by using selector circuits. The offset amount is merely set to a fixed value, so that an offset processing circuit can be also easily configured by using selector circuits. Thus, the circuit for the weighting operation can be configured by only connecting an adder circuit to the output of the inclination processing circuit and the output of the offset processing circuit.

As described above, this embodiment sets the inclination of the output value to the input value set in the weighting part 52 in a section where the input value is larger than those in other sections is steeper than the inclinations in the other sections, which enables increase of the difference between the accumulation evaluation values obtained from the accumulating part 53 for the proper quantization phase and the improper quantization phase. Moreover, this embodiment relatively reduces noise contribution. Therefore, this embodiment can increase adjustment accuracy of the quantization clock (quantization phase and quantization frequency).

Furthermore, since increasing the number of the sections increases the difference between the accumulation evaluation values for the proper quantization phase and the improper quantization phase even when the change amount of the video signal level is not significantly large, dependence of the quantization clock adjustment on a pattern of the video signal is small. Moreover, since the circuit can be configured by mainly using the selector circuits, the circuit scale can be reduced as compared with a case of configuring a squaring circuit.

Embodiment 2

Next, description will be made of a second embodiment (Embodiment 2) of the present invention. The configuration of the display apparatus of this embodiment is as described above with reference to FIG. 1.

In this embodiment, the weighting operation performed in the weighting part 52 satisfies the following third and fourth conditions in addition to the above-described first and second conditions. The third condition is that, when $m_i$ (i=1, 2, ..., I−1) represents a boundary value between two sections adjacent to each other among I sections obtained by dividing the entire range $0-2^n-1$ of the input value to the weighting part 52, from one section (first section) including 0 to another section (second section) including $2^{n-1}$ among the I sections, the output values from the weighting part 52 for arbitrary ones k1, k2 and k3 of the input values to the weighting part 52 satisfy the following relationships (conditions) where k1, k2 and k3 have a relationship of $k1<m_{i-1}\leq k2<k3<m_i$:

$$a(k1+1)-a(k1)<a(k2+1)-a(k2)$$

$$a(k2+1)-a(k2)=a(k3+1)-a(k3).$$

That is, in the third condition, from the section including 0 to the section including $2^{n-1}$, the inclination of the output value to the input value set in the weighting part 52 in a section where the input value is larger than those in other sections is steeper (larger) than the inclinations in the other sections.

Moreover, the fourth condition is that, in a section (or sections) (third section) where the input value is greater than that of the section (second section) including $2^{n-1}$, the output values from the weighting part 52 for arbitrary ones k4 and k5 of the input values to the weighting part 52 satisfy the following relationships (conditions) where k4 and k5 have a relationship of $2^{n-1}\leq k4<mi\leq k5$:

$$a(k5-k4)-a(k5-(k4+1))<a(k4+1)-a(k4).$$

If applying the same condition as that of the third condition to the section where the input value is greater than that of the section including $2^{n-1}$, the inclination of the output value to the input value becomes too steep. Thus, the fourth condition is to reduce the inclination.

Figures 5A, 5B:
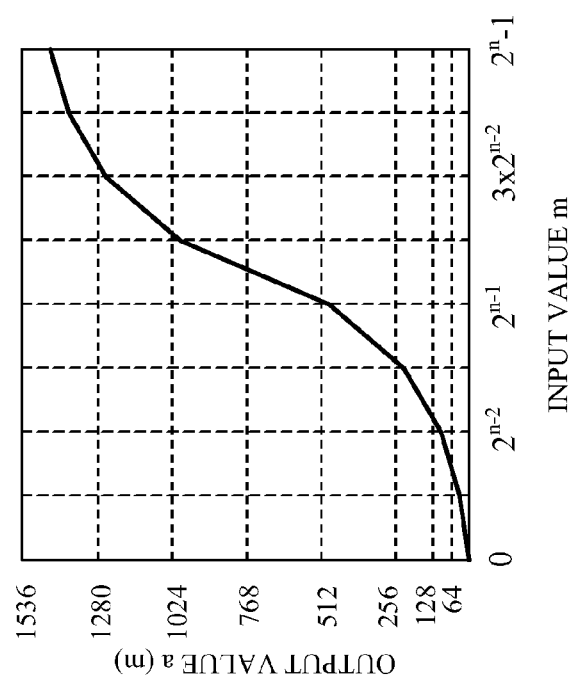
FIG. 5A and FIG. 5B shows an input-output relation of the weighting part in the display apparatus of Embodiment 2.
Figure 6:
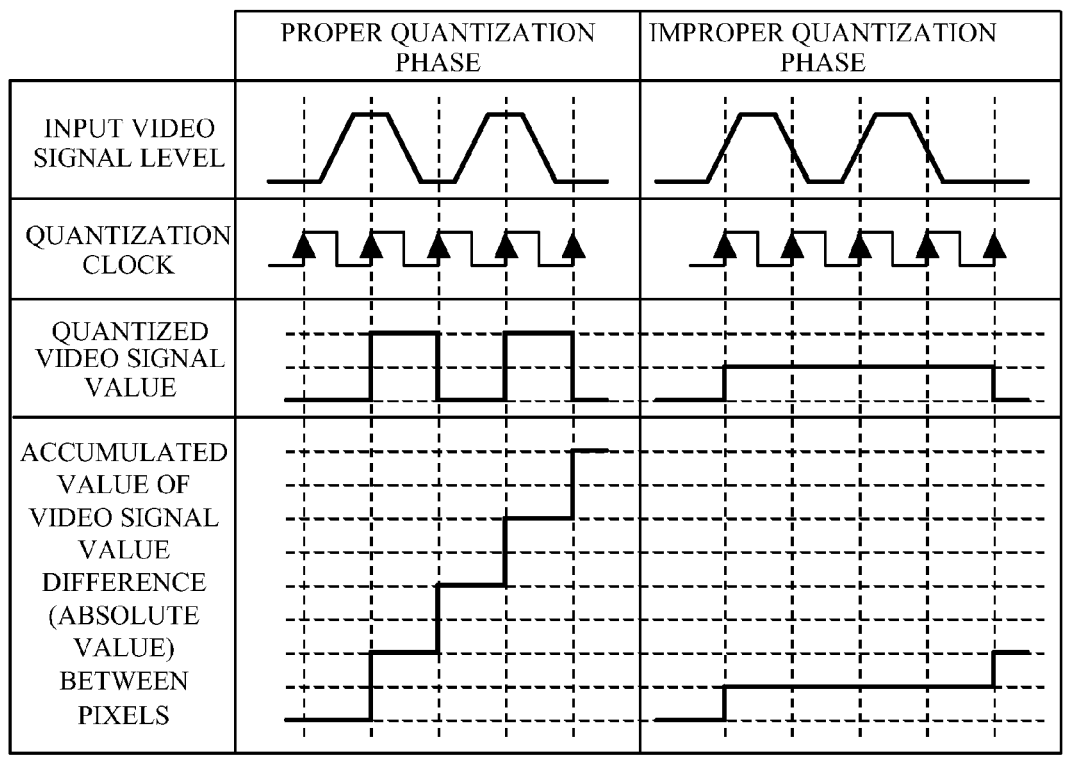
FIG. 6 shows a conventional example of a video signal including a lot of parts where the inclination of the video signal level change reverses at each pixel.
Figure 7:
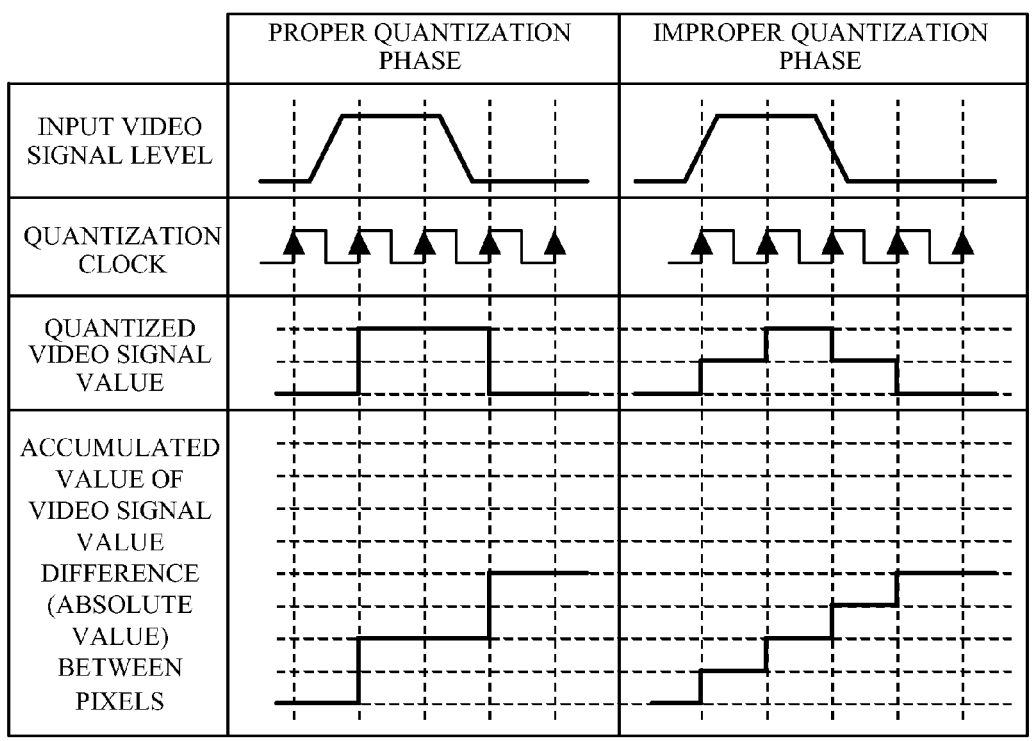
FIG. 7 shows a conventional example of a video signal including few parts where the inclination of the video signal level change reverses at each pixel.

FIGS. 5A and 5B show an example of a weighting operation characteristic that satisfies the first to fourth conditions. In FIGS. 5A and 5B, the quantization part 4 performs 8-bit quantization, and the section division is performed by using multiples of $2^5$ as boundaries (boundary values). Moreover, in the sections to the section including $2^7$, the inclination of the output value to the input value set in the weighting part 52 increases with each change of the section over the boundary to twice the inclination in the previous section. On the other hand, in the section where the input value is greater than that of the section including $2^7$, the inclination of the output value to the input value set in the weighting part 52 decreases with each change of the section over the boundary to half the inclination in the previous section.

FIG. 5A shows a graph indicating the relationship between the input value and the output value (input-output relation), and FIG. 5B shows the input value (difference), the inclination of the output value to the input value and an offset amount in each of the sections.

In order to realize the weighting operation characteristic shown in FIGS. 5A and 5B, this embodiment provides the following circuit configuration to the weighting part 52. Specifying the section can be performed by using high three bits, as in Embodiment 1. The inclination processing circuit and the offset processing circuit can be also easily configured by using selector circuits, as in Embodiment 1. Moreover, as shown in FIG. 5B, the inclination is reduced in the sections from the section 6, so that the number of bits handled in the inclination processing circuit and the offset processing circuit is reduced, which reduces the number of the required selector circuits.

As described above, this embodiment sets, in the sections to the section including $2^{n-1}$, the inclination of the output value to the input value set in the weighting part 52 in a section where the input value is larger than those in other sections is steeper than the inclinations in the other sections, and sets, in the section where the input value is greater than that of the section including $2^{n-1}$, the inclination in a section where the input value is larger than those in other sections is gentler than the inclinations in the other sections. This makes it possible to further reduce the circuit scale than in Embodiment 1.

Moreover, satisfying the fourth condition enables automatic adjustment of the quantization clock (quantization phase and quantization frequency) to a proper clock even though the input video signal includes few or almost no parts where the inclination of the video signal level change reverses at each pixel.

Furthermore, satisfying the third condition increases the difference between the accumulation evaluation values for the proper quantization phase and the improper quantization phase even when the change amount of the video signal level is not significantly large, dependence of the quantization clock adjustment on a pattern of the video signal is small.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-138537, filed on Jun. 17, 2010, which is hereby incorporated by reference herein in its entirety.

What is claimed is:

1. A display apparatus comprising:
an image display element configured to be driven based on a digital video signal to display a video;
a quantizing part configured to convert an input analog image signal into the digital video signal based on a quantization phase and a quantization frequency;
a converting part configured to convert an input value into an output value, the input value being a difference value of signal values of pixels adjacent to each other in the digital video signal;
an accumulating part configured to accumulate the output values from the converting part that converts the difference values obtained over entire pixels in one frame of the digital video signal to produce an accumulation evaluation value; and
a controller configured to adjust the quantization phase in the quantizing part such that the accumulation evaluation value becomes maximum,
wherein, when n represents a number of bits of the digital video signal, a(m) represents the output value from the converting part for the input value m thereto, and $m_i$ (i=1, 2, . . . , I–1) represents a boundary value between two sections adjacent to each other among I sections obtained by dividing an entire range $0\text{-}2^n\text{–}1$ of the input value in the converting part, the output values from the converting part for arbitrary ones k1, k2 and k3 of the input values satisfy the following conditions where k1, k2 and k3 have a relationship of $k1<m_{i-1}\leq k2<k3<m_i$:

$a(k1+1)-a(k1)<a(k2+1)-a(k2)$ $a(k2+1)-a(k2)=a(k3+1)-a(k3)$.

2. A display apparatus comprising:
an image display element configured to be driven based on a digital video signal to display a video;
a quantizing part configured to convert an input analog image signal into the digital video signal based on a quantization phase and a quantization frequency;
a converting part configured to convert an input value into an output value, the input value being a difference value of signal values of pixels adjacent to each other in the digital video signal;
an accumulating part configured to accumulate the output values from the converting part that converts the difference values obtained over entire pixels in one frame of the digital video signal to produce an accumulation evaluation value; and
a controller configured to adjust the quantization frequency in the quantizing part to a frequency at which a ratio of a maximum value of the accumulation evaluation value produced for each quantization phase to a minimum value thereof becomes maximum,
wherein, when n represents a number of bits of the digital video signal, a(m) represents the output value from the converting part for the input value m thereto, and $m_i$ (i=1, 2, . . . , I–1) represents a boundary value between two sections adjacent to each other among I sections obtained by dividing an entire range $0\text{-}2^n\text{–}1$ of the input value in the converting part, the output values from the converting part for arbitrary ones k1, k2 and k3 of the input values satisfy the following conditions where k1, k2 and k3 have a relationship of $k1<m_{i-1}\leq k2<k3<m_i$:

$a(k1+1)-a(k1)<a(k2+1)-a(k2)$ $a(k2+1)-a(k2)=a(k3+1)-a(k3)$.

3. A display apparatus comprising:
an image display element configured to be driven based on a digital video signal to display a video;
a quantizing part configured to convert an input analog image signal into the digital video signal based on a quantization phase and a quantization frequency;
a converting part configured to convert an input value into an output value, the input value being a difference value of signal values of pixels adjacent to each other in the digital video signal;
an accumulating part configured to accumulate the output values from the converting part that converts the difference values obtained over entire pixels in one frame of the digital video signal to produce an accumulation evaluation value; and
a controller configured to adjust the quantization phase in the quantizing part such that the accumulation evaluation value becomes maximum,
wherein, when n represents a number of bits of the digital video signal, a(m) represents the output value from the converting part for the input value m thereto, and $m_i$ (i=1, 2, . . . , I–1) represents a boundary value between two sections adjacent to each other among I sections obtained by dividing an entire range $0\text{-}2^n\text{–}1$ of the input value in the converting part,
from a first section including 0 to a second section including $2^{n-1}$ among the I sections, the output values from the converting part for arbitrary ones k1, k2 and k3 of the input values satisfy the following conditions where k1, k2 and k3 have a relationship of $k1<m_{i-1}\leq k2<k3<m_i\leq 2^{n-1}$:

$a(k1+1)-a(k1)<a(k2+1)-a(k2)$ $a(k2+1)-a(k2)=a(k3+1)-a(k3)$, and in a third section where the input value is greater than that of the second section among the I sections, the output values from the converting part for arbitrary ones k4 and k5 of the input values satisfy the following conditions where k4 and k5 have a relationship of $2^{n-1} \leq k4 < m_i \leq k5$:

$$a(k5-k4)-a(k5-(k4+1))<a(k4+1)-a(k4).$$

4. A display apparatus comprising:
an image display element configured to be driven based on a digital video signal to display a video;
a quantizing part configured to convert an input analog image signal into the digital video signal based on a quantization phase and a quantization frequency;
a converting part configured to convert an input value into an output value, the input value being a difference value of signal values of pixels adjacent to each other in the digital video signal;
an accumulating part configured to accumulate the output values from the converting part that converts the difference values obtained over entire pixels in one frame of the digital video signal to produce an accumulation evaluation value; and
a controller configured to adjust the quantization frequency in the quantizing part to a frequency at which a ratio of a maximum value of the accumulation evaluation value produced for each quantization phase to a minimum value thereof becomes maximum,
wherein, when n represents a number of bits of the digital video signal, a(m) represents the output value from the converting part for the input value m thereto, and $m_i$ (i=1, 2, ..., I−1) represents a boundary value between two sections adjacent to each other among I sections obtained by dividing an entire range $0 - 2^n - 1$ of the input value in the converting part,
from a first section including 0 to a second section including $2^{n-1}$ among the I sections, the output values from the converting part for arbitrary ones k1, k2 and k3 of the input values satisfy the following conditions where k1, k2 and k3 have a relationship of $k1 < m_{i-1} \leq k2 < k3 < m_i \leq 2^{n-1}$:

$$a(k1+1)-a(k1)<a(k2+1)-a(k2)$$

$$a(k2+1)-a(k2)=a(k3+1)-a(k3), \text{ and}$$

in a third section where the input value is greater than that of the second section among the I sections, the output values from the converting part for arbitrary ones k4 and k5 of the input values satisfy the following conditions where k4 and k5 have a relationship of $2^{n-1} \leq k4 < m_i \leq k5$:

$$a(k5-k4)-a(k5-(k4+1))<a(k4+1)-a(k4).$$

* * * * *